(12) United States Patent
Morisaka et al.

(10) Patent No.: US 9,457,317 B2
(45) Date of Patent: Oct. 4, 2016

(54) OXIDATION CATALYST AND METHOD FOR PRODUCING THE OXIDATION CATALYST

(75) Inventors: Hideaki Morisaka, Yokohama (JP); Yasunari Hanaki, Yokohama (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 654 days.

(21) Appl. No.: 12/673,343

(22) PCT Filed: Aug. 7, 2008

(86) PCT No.: PCT/JP2008/064193
§ 371 (c)(1),
(2), (4) Date: Feb. 12, 2010

(87) PCT Pub. No.: WO2009/022620
PCT Pub. Date: Feb. 19, 2009

(65) Prior Publication Data
US 2012/0122673 A1    May 17, 2012

(30) Foreign Application Priority Data

Aug. 13, 2007  (JP) ................................ 2007-210798
Feb. 19, 2008  (JP) ................................ 2008-036949
Jun. 27, 2008  (JP) ................................ 2008-168404

(51) Int. Cl.
| B01J 21/00 | (2006.01) |
| B01J 23/00 | (2006.01) |
| B01J 23/10 | (2006.01) |
| B01J 25/00 | (2006.01) |

(Continued)

(52) U.S. Cl.
CPC ............ *B01D 53/944* (2013.01); *B01J 23/002* (2013.01); *B01J 23/10* (2013.01); *B01J 23/34* (2013.01); *B01J 23/83* (2013.01); *B01J 37/031* (2013.01); *B01D 2255/206* (2013.01); *B01D 2255/2073* (2013.01); *B01D 2255/20738* (2013.01); *B01D 2258/012* (2013.01); *B01J 2523/00* (2013.01)

(58) Field of Classification Search
USPC ........ 502/304, 324, 325, 327, 355, 100, 300, 502/302
See application file for complete search history.

(56) References Cited

U.S. PATENT DOCUMENTS

| 4,426,319 A | 1/1984 | Blanchard et al. |
| 4,705,908 A | 11/1987 | Gondouin |

(Continued)

FOREIGN PATENT DOCUMENTS

| EP | 0 517 554 A1 | 12/1992 |
| EP | 1 920 831 A2 | 5/2008 |

(Continued)

OTHER PUBLICATIONS

Yuzhakova et al., Preparation and Characterization of Me2O3—CeO2(Me=B, Al, Ga, In) Mixed-Oxide Catalysts, 2007, Chem. Mater., 19. 2970-2981.*

(Continued)

*Primary Examiner* — James McDonough
(74) *Attorney, Agent, or Firm* — Foley & Lardner LLP

(57) ABSTRACT

An oxidation catalyst is disclosed, which contains Ce and Ga, and a Ce—Ga composite oxide containing a solid solution in which a part of Ce is substituted with Ga. This oxidation catalyst is obtained in such a manner that pH of a mixed solution obtained by mixing a Ce-containing solution and a Ga-containing solution together is adjusted, and a precipitate obtained by coprecipitating Ce and Ga is dried and baked.

15 Claims, 5 Drawing Sheets

(51) Int. Cl.
*B01J 29/00* (2006.01)
*B01D 53/94* (2006.01)
*B01J 23/34* (2006.01)
*B01J 23/83* (2006.01)
*B01J 37/03* (2006.01)

(56) References Cited

U.S. PATENT DOCUMENTS

| | | | |
|---|---|---|---|
| 5,280,002 A | 1/1994 | Bonneau et al. | |
| 5,550,095 A | 8/1996 | Naito et al. | |
| 6,723,869 B1 | 4/2004 | Mori et al. | |
| 2003/0118879 A1* | 6/2003 | Barnett | H01M 4/8621 429/486 |
| 2005/0074664 A1* | 4/2005 | Song | H01M 4/8652 429/486 |
| 2005/0112453 A1* | 5/2005 | Song | H01M 4/8642 429/486 |
| 2005/0236271 A1* | 10/2005 | Izu | G01N 27/12 204/424 |
| 2006/0213187 A1* | 9/2006 | Kupe | B01D 53/9431 60/286 |
| 2007/0191220 A1* | 8/2007 | Bog | B01D 53/945 502/304 |
| 2014/0127609 A1* | 5/2014 | Jacobson | H01M 8/1246 429/482 |

FOREIGN PATENT DOCUMENTS

| | | | |
|---|---|---|---|
| GB | 2 090 156 A | 7/1982 |
| JP | 57-130549 A | 8/1982 |
| JP | 62-501359 A | 6/1987 |
| JP | 5-309273 A | 11/1993 |
| JP | 7-299369 A | 11/1995 |
| JP | 7-303836 A | 11/1995 |
| JP | 9-313941 A | 12/1997 |
| JP | 10-277392 A | 10/1998 |
| JP | 2000-84412 A | 3/2000 |
| JP | 2001-187772 A | 7/2001 |
| JP | 2002-97016 A | 4/2002 |
| JP | 2003-144931 A | 5/2003 |
| JP | 2004-160435 A | 6/2004 |
| JP | 2005-52730 A | 3/2005 |
| JP | 2007-54713 A | 3/2007 |

OTHER PUBLICATIONS

Yuzhakova, T. et al., "Preparation and Characterization of $Me_2O_3$—$CeO_2$ (Me=B, Al, Ga, In) Mixed-Oxide Catalysts", *Chemistry of Materials*, vol. 19, No. 12, (2007), pp. 2970-2981.

Lee, J-S. et al., "Effects of gallia additions on sintering behavior of gadolinia-doped ceria", *Materials Research Bulletin, Elsevier*, vol. 39, No. 13, (2004), pp. 2025-2033.

Yoshida, H. et al., "Sintering behavior of Ln-doped ceria compounds containing Gallia", *Journal of Power Sources, Elsevier*, vol. 106, No. 1-2, (2002), pp. 136-141.

Japanese Office Action and English language translation dated Aug. 30, 2013 (7 pages).

* cited by examiner

FIG.1
(a) 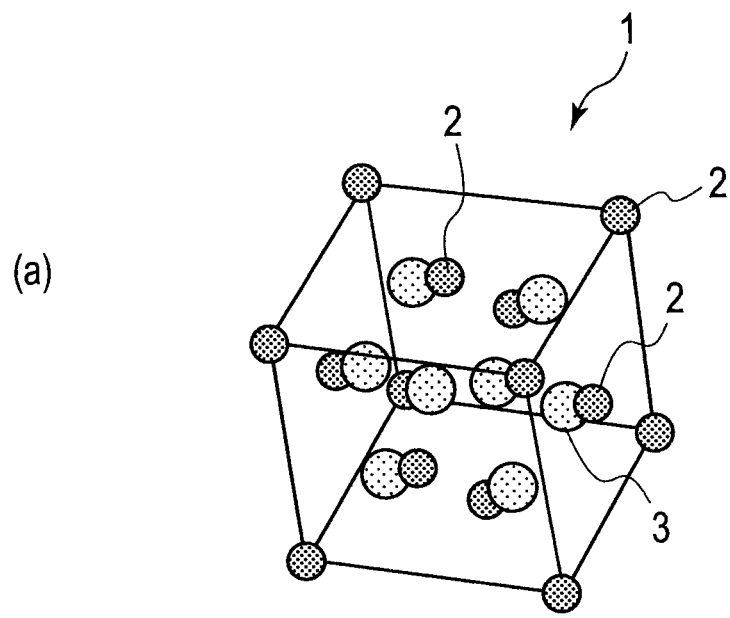
(b) 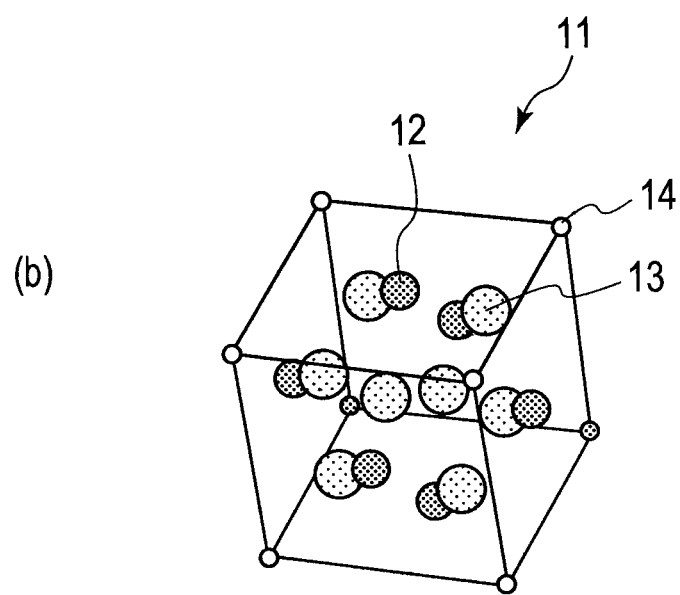

FIG.2
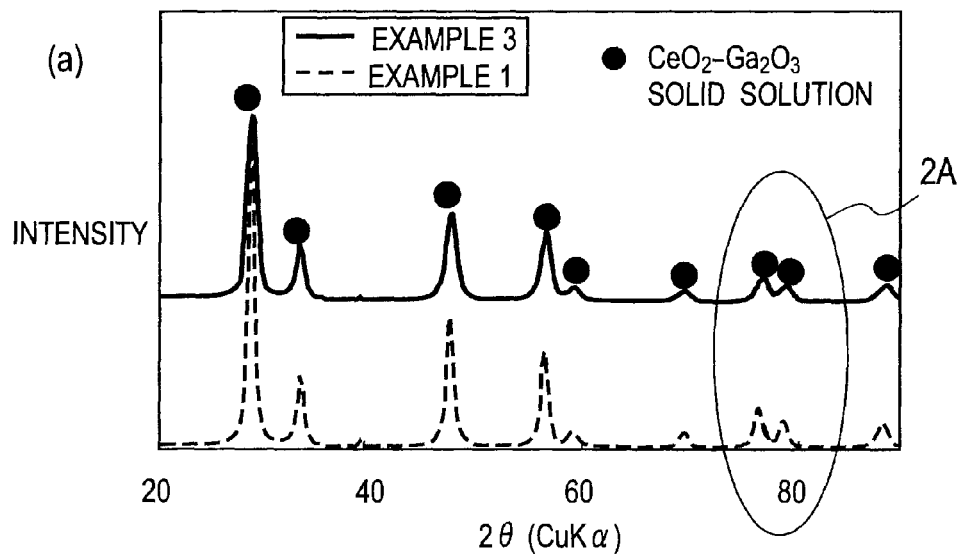
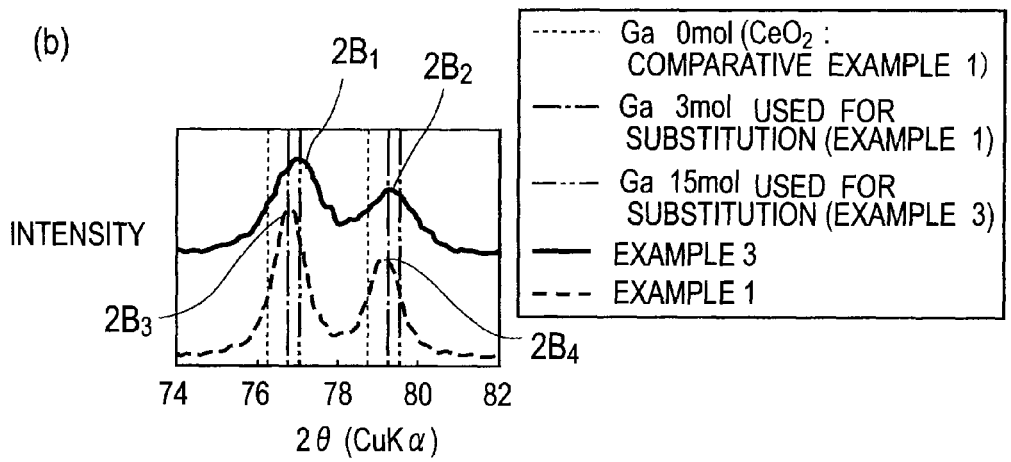

FIG.3

| | Ce (mol) | Ga (mol) | Mn (mol) | Fe (mol) | ALKALI RAW MATERIAL | CRYSTAL PHASE | OXIDATION STARTING TEMPERATURE (°C) |
|---|---|---|---|---|---|---|---|
| EXAMPLE1 | 97 | 3 | - | - | NaOH AQUEOUS SOLUTION | $CeO_2$ SOLID SOLUTION | 340 |
| EXAMPLE2 | 95 | 5 | - | - | NaOH AQUEOUS SOLUTION | $CeO_2$ SOLID SOLUTION | 330 |
| EXAMPLE3 | 85 | 15 | - | - | NaOH AQUEOUS SOLUTION | $CeO_2$ SOLID SOLUTION | 350 |
| EXAMPLE4 | 68 | 32 | - | - | NaOH AQUEOUS SOLUTION | $CeO_2$ SOLID SOLUTION + $Ga_2O_3$ | 450 |
| EXAMPLE5 | 97 | 3 | - | - | $NH_3$ AQUEOUS SOLUTION | $CeO_2$ SOLID SOLUTION | 420 |
| EXAMPLE6 | 95 | 5 | - | - | $NH_3$ AQUEOUS SOLUTION | $CeO_2$ SOLID SOLUTION | 410 |
| EXAMPLE7 | 85 | 15 | - | - | $NH_3$ AQUEOUS SOLUTION | $CeO_2$ SOLID SOLUTION | 440 |
| EXAMPLE8 | 68 | 32 | - | - | $NH_3$ AQUEOUS SOLUTION | $CeO_2$ SOLID SOLUTION + $Ga_2O_3$ | 500 |
| EXAMPLE9 | 97 | 3 | 5 | - | NaOH AQUEOUS SOLUTION | $CeO_2$ SOLID SOLUTION | 330 |
| EXAMPLE10 | 97 | 3 | 10 | - | NaOH AQUEOUS SOLUTION | $CeO_2$ SOLID SOLUTION | 325 |
| EXAMPLE11 | 97 | 3 | 20 | - | NaOH AQUEOUS SOLUTION | $CeO_2$ SOLID SOLUTION | 315 |
| EXAMPLE12 | 97 | 3 | 30 | - | NaOH AQUEOUS SOLUTION | $CeO_2$ SOLID SOLUTION | 310 |
| EXAMPLE13 | 97 | 3 | 50 | - | NaOH AQUEOUS SOLUTION | $CeO_2$ SOLID SOLUTION + $Mn_3O_4$ | 335 |
| EXAMPLE14 | 95 | 5 | 5 | - | NaOH AQUEOUS SOLUTION | $CeO_2$ SOLID SOLUTION | 315 |
| EXAMPLE15 | 95 | 5 | 10 | - | NaOH AQUEOUS SOLUTION | $CeO_2$ SOLID SOLUTION | 310 |
| EXAMPLE16 | 95 | 5 | 20 | - | NaOH AQUEOUS SOLUTION | $CeO_2$ SOLID SOLUTION | 295 |
| EXAMPLE17 | 95 | 5 | 30 | - | NaOH AQUEOUS SOLUTION | $CeO_2$ SOLID SOLUTION | 295 |
| EXAMPLE18 | 95 | 5 | 50 | - | NaOH AQUEOUS SOLUTION | $CeO_2$ SOLID SOLUTION + $Mn_3O_4$ | 335 |
| EXAMPLE19 | 85 | 15 | 5 | - | NaOH AQUEOUS SOLUTION | $CeO_2$ SOLID SOLUTION | 340 |
| EXAMPLE20 | 85 | 15 | 10 | - | NaOH AQUEOUS SOLUTION | $CeO_2$ SOLID SOLUTION | 335 |
| EXAMPLE21 | 85 | 15 | 20 | - | NaOH AQUEOUS SOLUTION | $CeO_2$ SOLID SOLUTION | 325 |
| EXAMPLE22 | 85 | 15 | 30 | - | NaOH AQUEOUS SOLUTION | $CeO_2$ SOLID SOLUTION | 315 |
| EXAMPLE23 | 85 | 15 | 50 | - | NaOH AQUEOUS SOLUTION | $CeO_2$ SOLID SOLUTION + $Mn_3O_4$ | 340 |
| EXAMPLE24 | 68 | 32 | 5 | - | NaOH AQUEOUS SOLUTION | $CeO_2$ SOLID SOLUTION + $Ga_2O_3$ | 440 |
| EXAMPLE25 | 68 | 32 | 10 | - | NaOH AQUEOUS SOLUTION | $CeO_2$ SOLID SOLUTION + $Ga_2O_3$ | 430 |
| EXAMPLE26 | 68 | 32 | 20 | - | NaOH AQUEOUS SOLUTION | $CeO_2$ SOLID SOLUTION + $Ga_2O_3$ | 415 |
| EXAMPLE27 | 68 | 32 | 30 | - | NaOH AQUEOUS SOLUTION | $CeO_2$ SOLID SOLUTION + $Ga_2O_3$ | 410 |
| EXAMPLE28 | 68 | 32 | 50 | - | NaOH AQUEOUS SOLUTION | $CeO_2$ SOLID SOLUTION + $Ga_2O_3$ + $Mn_3O_4$ | 445 |
| EXAMPLE29 | 97 | 3 | - | 5 | NaOH AQUEOUS SOLUTION | $CeO_2$ SOLID SOLUTION | 330 |
| EXAMPLE30 | 97 | 3 | - | 10 | NaOH AQUEOUS SOLUTION | $CeO_2$ SOLID SOLUTION | 330 |
| EXAMPLE31 | 97 | 3 | - | 20 | NaOH AQUEOUS SOLUTION | $CeO_2$ SOLID SOLUTION | 325 |
| EXAMPLE32 | 97 | 3 | - | 25 | NaOH AQUEOUS SOLUTION | $CeO_2$ SOLID SOLUTION | 320 |
| EXAMPLE33 | 97 | 3 | - | 30 | NaOH AQUEOUS SOLUTION | $CeO_2$ SOLID SOLUTION | 315 |
| EXAMPLE34 | 97 | 3 | - | 35 | NaOH AQUEOUS SOLUTION | $CeO_2$ SOLID SOLUTION | 325 |
| EXAMPLE35 | 97 | 3 | - | 50 | NaOH AQUEOUS SOLUTION | $CeO_3$ SOLID SOLUTION + $Fe_2O_3$ | 340 |
| EXAMPLE36 | 95 | 5 | - | 5 | NaOH AQUEOUS SOLUTION | $CeO_2$ SOLID SOLUTION | 320 |
| EXAMPLE37 | 95 | 5 | - | 10 | NaOH AQUEOUS SOLUTION | $CeO_2$ SOLID SOLUTION | 315 |
| EXAMPLE38 | 95 | 5 | - | 20 | NaOH AQUEOUS SOLUTION | $CeO_2$ SOLID SOLUTION | 310 |
| EXAMPLE39 | 95 | 5 | - | 25 | NaOH AQUEOUS SOLUTION | $CeO_2$ SOLID SOLUTION | 310 |
| EXAMPLE40 | 95 | 5 | - | 30 | NaOH AQUEOUS SOLUTION | $CeO_2$ SOLID SOLUTION | 310 |
| EXAMPLE41 | 95 | 5 | - | 35 | NaOH AQUEOUS SOLUTION | $CeO_2$ SOLID SOLUTION | 320 |
| EXAMPLE42 | 95 | 5 | - | 50 | NaOH AQUEOUS SOLUTION | $CeO_3$ SOLID SOLUTION + $Fe_2O_3$ | 340 |
| COMPARATIVE EXAMPLE1 | 100 | - | - | - | NaOH AQUEOUS SOLUTION | $CeO_2$ | 510 |
| COMPARATIVE EXAMPLE2 | 100 | - | - | - | $NH_3$ AQUEOUS SOLUTION | $CeO_2$ | 550 |

FIG. 5
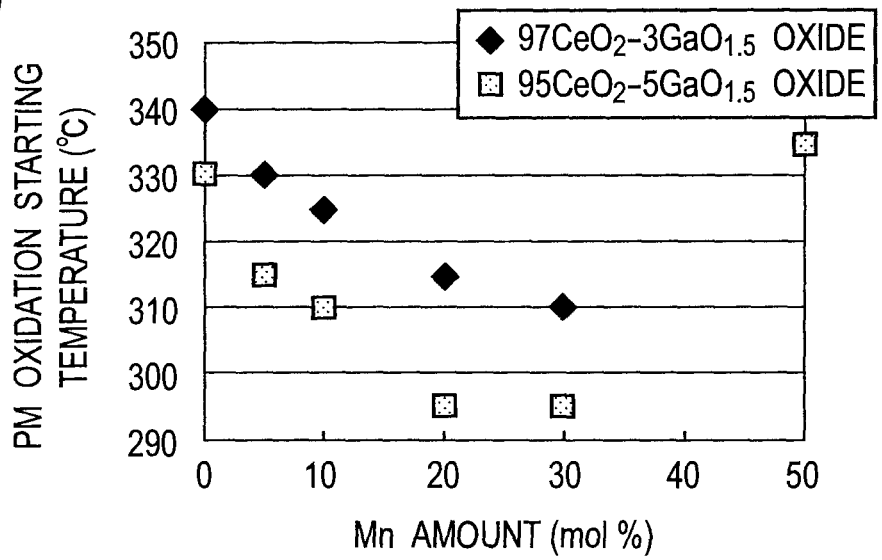
(a)
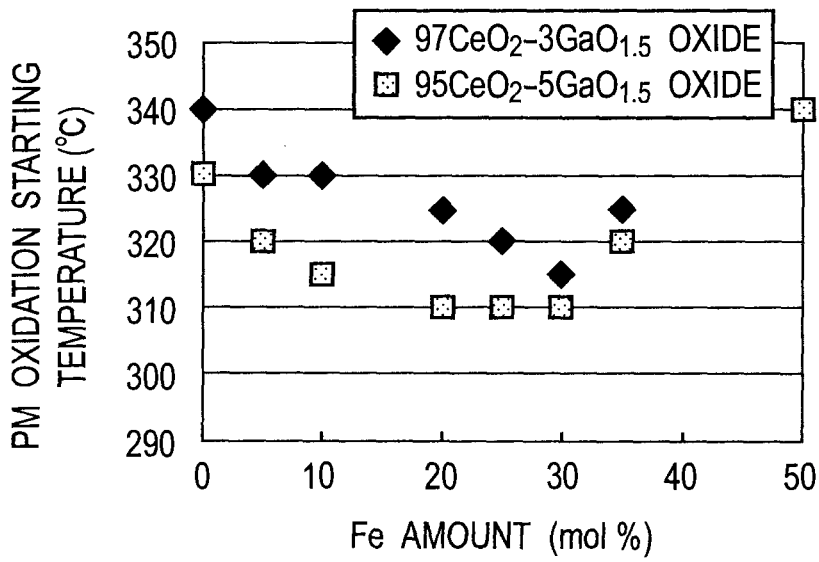
(b)

OXIDATION CATALYST AND METHOD FOR PRODUCING THE OXIDATION CATALYST

TECHNICAL FIELD

This invention relates to an oxidation catalyst and a method for producing the oxidation catalyst, and more specifically, relates to an oxidation catalyst that decreases an oxidation or combustion temperature of particulate matter (PM), and to a method for producing the oxidation catalyst.

BACKGROUND ART

An oxidation catalyst for promoting combustion of PM is proposed. For example, in Japanese Patent Unexamined Publication No. 2007-54713, a diesel particulate filter is proposed, in which a decrease of a PM combustion temperature is attempted. This diesel particulate filter is a filter in which a catalyst that supports a platinum group such as Pt and Rh on an oxygen supply oxide including at least one of a zirconium-based multiple oxide and a cerium-based multiple oxide is coated on a ceramic-made honeycomb having alternately sealed channels.

DISCLOSURE OF INVENTION

However, in the conventional diesel particulate filter, the decrease of the PM combustion temperature is not sufficient though attempted.

The present invention has been made in consideration of such a problem inherent in the conventional technology. It is an object of the present invention to provide an oxidation catalyst capable of particularly decreasing a PM oxidation temperature in an effective manner, and to provide a method for producing the oxidation catalyst.

An oxidation catalyst according to the present invention includes: Ce and Ga; and a Ce—Ga composite oxide containing a solid solution in which a part of Ce is substituted with Ga.

A method for producing an oxidation catalyst according to the present invention includes the steps of: mixing a Ce-containing solution and a Ga-containing solution together, thereby obtaining a mixed solution; adding an aqueous alkali metal solution or an aqueous ammonia solution to the mixed solution to thereby adjust pH thereof, and coprecipitating Ce and Ga to thereby obtain a precipitate; and drying and baking the precipitate.

BRIEF DESCRIPTION OF DRAWINGS

FIG. 1(a) is a schematic perspective view showing a crystal structure of $CeO_2$. FIG. 1(b) is a schematic perspective view showing a crystal structure of a Ce—Ga composite oxide that composes an oxidation catalyst according to an embodiment of the present invention.

FIG. 2(a) is an explanatory diagram showing whether or not solid solution occurred. FIG. 2(b) is an explanatory diagram in which a portion 2A of FIG. 2(a) is enlarged. FIG. 2(c) is a table showing peak positions of FIG. 2(b).

FIG. 3 is a table showing data obtained in Examples.

FIG. 5(a) is a graph showing relationships between Mn amount and measured values of PM oxidation starting temperatures. FIG. 5(b) is a graph showing relationships between Fe amount and measured values of the PM oxidation starting temperatures.

BEST MODE FOR CARRYING OUT THE INVENTION

Figure 4:
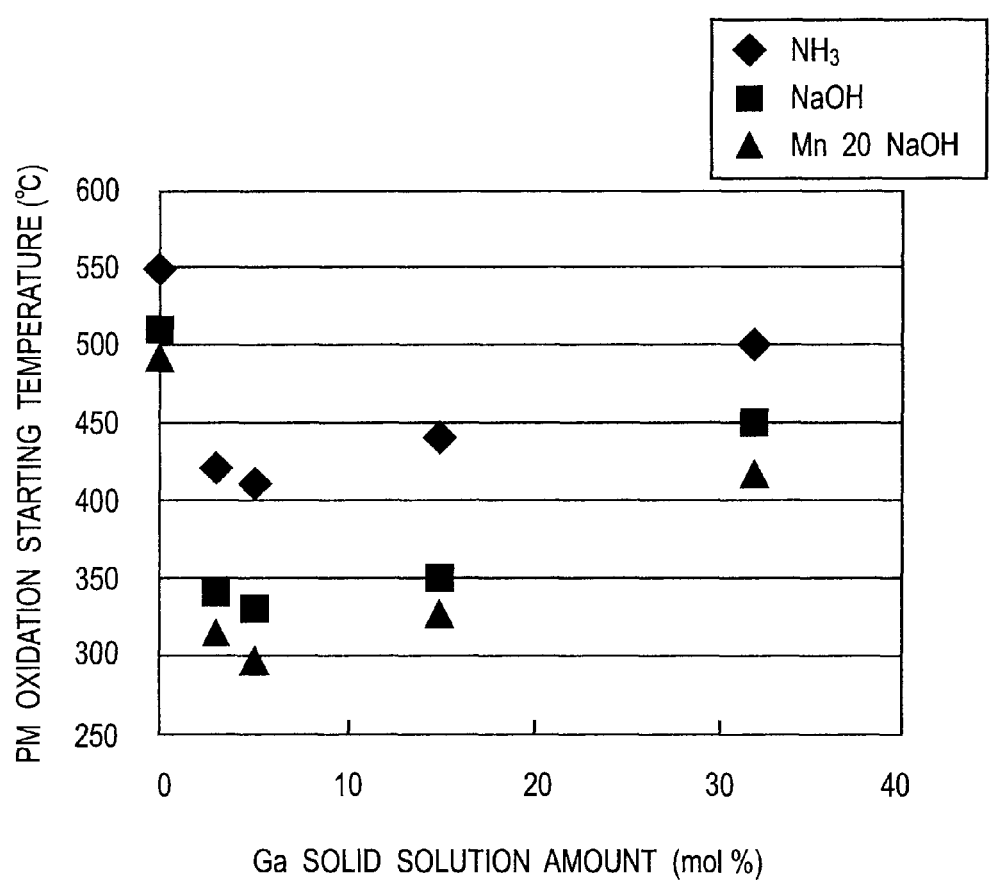
FIG. 4 is a graph showing relationships between Ga solid solution amounts and measured values of PM combustion temperatures.

A description will be made below of an oxidation catalyst according to an embodiment of the present invention and a method for producing the oxidation catalyst.

As the oxidation catalyst according to the embodiment of the present invention, here, mentioned as an example thereof is a particulate matter (PM) oxidation catalyst to be used for promoting combustion of PM containing, as a main component, soot emitted from a diesel engine or for decreasing a combustion temperature of the PM.

The oxidation catalyst according to the embodiment of the present invention contains cerium (Ce) and gallium (Ga), and a Ce—Ga composite oxide containing a solid solution in which a part of Ce is substituted with Ga. A usual crystal structure 1 of $CeO_2$ is shown in FIG. 1A, and a crystal structure 11 of the Ce—Ga composite oxide that composes the oxidation catalyst according to the embodiment of the present invention is shown in FIG. 1B. As shown in FIG. 1A, in the usual crystal structure 1 of $CeO_2$, Ce atoms 2 exist at positions of vertices and face centers of a cubic lattice, and oxygen atoms 3 exist at centers of small cubes obtained by dividing the cubic lattice into eight equal parts in such a manner that each side of the cubic lattice is halved. As opposed to this, in the crystal structure 11 of the Ce—Ga composite oxide, as shown in FIG. 1B, a structure is formed, in which the Ce atoms existing at the vertices and face centers of the cubic lattice are partially substituted with Ga atoms 14. Specifically, this Ce—Ga composite oxide uses the crystal structure (fluorite structure) of $CeO_2$ as a basic structure, and the crystal structure 11 of the Ce—Ga composite oxide forms a fluorite crystal structure, in which Ce atoms 12 and the Ga atoms 14 exist at positions of vertices and face centers of a cubic lattice, and oxygen atoms 13 are located at centers of small cubes obtained by dividing the cubic lattice into eight equal parts in such a manner that each side of the cubic lattice is halved. As described above, the oxidation catalyst according to the embodiment of the present invention contains the Ce—Ga composite oxide, and this Ce—Ga composite oxide forms a solid solution in which the Ce atoms are partially substituted with the Ga atoms.

An ion radius of $Ce^{4+}$ is approximately 0.097 nm, and an ion radius of $Ga^{3+}$ is approximately 0.062 nm. In the crystal structure of $CeO_2$, the Ce atoms are substituted with the Ga atoms by the solid solution of the Ga atoms, and electric charges are reduced in response to an amount of the substitution. Then, in order to balance the electric charges of the entirety of the oxide, oxide ions ($O^{2-}$) at lattice positions come out so as to correspond to a solid solution amount of the Ga atoms, and oxide ion holes are generated. In such a way, by the solid solution of the Ga atoms, oxygen holes are generated, and spaces are generated in a specific direction in the Ce cubic lattice, whereby mobility of the oxide ions through the holes is enhanced. It is guessed that, by the fact that the mobility of the oxide ions is enhanced in such a way, that is, a temperature at which active oxygen is generated decreases, the active oxygen can be utilized effectively, and a temperature at which the PM is oxidized or burned decreases. In such a way, the oxidation catalyst according to the embodiment of the present invention contains the Ce—Ga composite oxide that uses the crystal structure of $CeO_2$, which has the fluorite structure, as the basic structure, whereby high oxide ion conductivity develops, and the PM oxidation temperature decreases.

Among a variety of the Ce—Ga composite oxides, a $CeO_2$—$Ga_2O_3$ composite oxide is particularly favorable. Moreover, in the Ce—Ga composite oxide, it is preferable that a molar ratio of Ce/Ga be 99.99/0.01 to 70/30. It is more preferable that the molar ratio of Ce/Ga be 97/3 to 85/15, and it is particularly preferable that the molar ratio of Ce/Ga be 97/3 to 95/5. If the molar ratio is lower than 70/30, then a substitution amount by the Ga atoms is increased to develop a $Ga_2O_3$ phase besides $CeO_2$, and performance of the oxidation catalyst decreases in some case. Moreover, it becomes impossible to maintain the fluorite structure of $CeO_2$, and the performance of the oxidation catalyst decreases in some case. Note that the PM oxidation temperature becomes the lowest temperature in the case where this molar ratio of Ce/Ga is equal to 97/3 to 95/5.

Moreover, in the oxidation catalyst according to the present invention, it is more preferable that the Ce—Ga composite oxide contain Mn or Fe. The PM oxidation temperature further decreases in such a manner that the Ce—Ga composite oxide contains Mn or Fe. The decrease of the PM oxidation temperature is assumed to be caused by any of the following functions. As a first reason, it is assumed that Mn or Fe itself becomes new active sites. As a second reason, it is assumed that the existence of Mn or Fe promotes supply of the active oxygen from the Ce—Ga composite oxide. As a third reason, it is assumed that the existence of Mn or Fe promotes supply of the active oxygen from a Ce—Ga—Mn composite oxide or a Ce—Ga—Fe composite oxide.

With regard to an amount of Mn or Fe, which the Ce—Ga composite oxide contains, for example, it is preferable that Mn or Fe be contained by 0.01 to 50 moles with respect to 100 moles of Ce and Ga in total, and it is more preferable that Mn or Fe be contained by 0.01 to 30 moles with respect thereto. If the amount of Mn or Fe is 0.01 mole or more, then the amount is sufficient for the PM oxidation in terms of the active sites, and also in terms of the supply of the active oxygen, sufficient emission of the active oxygen for oxidizing the PM is obtained. If the amount of Mn or Fe is 50 moles or less, then such PM oxidation activity can exert an effect appropriate to additive amount of Mn or Fe, and Mn or Fe can be utilized effectively, and does not cause the decrease of the activity owing to sintering. Note that, besides Mn and Fe, transition metal such as Co and Ni also has a similar effect.

It is preferable that the oxidation catalyst according to the embodiment of the present invention contain alkali metal. If the alkali metal exists on a surface of the Ce—Ga composite oxide, then this alkali metal moves to PM particles proximate thereto, and activates the PM particles themselves. The activated PM particles are broken to a suitable size, and are dispersed. As described above, it is conceived that the coexistence of the alkali metal promotes the oxidation of the PM.

It is preferable that the alkali metal to be contained be sodium (Na), and though no particular limitations are imposed on an amount of Na to be contained, it is preferable to set the amount of Na to be contained at 0.01 to 10 moles with respect to 1 mole of the Ce—Ga composite oxide. If the amount of Na is less than 0.01 mole, then the effect of decreasing the PM oxidation temperature is small in some case. If the amount of Na exceeds 10 moles, then the effect of decreasing the PM oxidation temperature reaches equilibrium in some case.

The oxidation catalyst according to the embodiment of the present invention contains the above-described Ce—Ga composite oxide as an essential component. Other components than the above, for example, noble metal such as platinum, a transition metal oxide such as Mn oxide, and another third component can be solid-solved in the composite oxide.

Moreover, the oxidation catalyst according to the embodiment of the present invention is usable by being carried on a monolithically constructed catalyst carrier such as a honeycomb-like monolithic carrier. In particular, in the case of taking, as a subject, PM of a lean combustion engine such as the diesel engine, the oxidation catalyst according to the embodiment of the present invention can be used for a so-called checkered honeycomb carrier in which one-side ends of cells are alternately sealed.

Next, a description will be made of a method for producing the oxidation catalyst according to the embodiment of the present invention. This production method is a method for producing the above-mentioned oxidation catalyst, and is a method of forming the Ce—Ga composite oxide in such a manner that a Ce-containing solution and a Ga-containing solution are mixed together to thereby obtain a mixed solution, an aqueous alkali metal solution or an aqueous ammonia solution is added to this mixed solution to thereby adjust pH thereof, Ca and Ga are coprecipitated to thereby obtain a precipitate, and this precipitate is dried and baked.

First, the Ce-containing solution and the Ga-containing solution are mixed together to thereby obtain the mixed solution as a precursor of the Ce—Ga composite oxide. The Ce-containing solution and the Ga-containing solution are obtained by dissolving nitrate of Ce and nitrate of Ga in a solvent. To this mixed solution, as a source of Mn, there can be added Mn nitrate, Mn hydroxide, Mn acid hydroxide, Mn carbonate or complexes of these. Moreover, in place of the above-described source of Mn, as a source of iron, there can also be added Fe nitrate, Fe hydroxide, Fe acid hydroxide, Fe carbonate or complexes of these.

Specifically, a raw material of Mn, such as the Mn nitrate, or a raw material of the iron, such as the Fe nitrate, is added to the mixed solution of the Ce nitrate and the Ga nitrate according to needs, and thereafter, an aqueous sodium hydroxide solution or the aqueous ammonia solution is added to an obtained resultant to thereby adjust pH thereof, and a mixture of Ce hydroxide and Ga hydroxide is coprecipitated. Thereafter, the mixture of the Ce hydroxide and the Ga hydroxide, which is generated by the precipitation, is dried at 100° C. to 150° C. for 8 hours to 24 hours, and is further baked at 500° C. to 700° C. for 5 hours to 8 hours, whereby the desired Ce—Ga composite oxide can be obtained.

Moreover, in the method for producing the oxidation catalyst according to the embodiment of the present invention, in the case of using the aqueous alkali metal solution in order to adjust pH of the obtained resultant, the alkali metal remains on the surface of the obtained Ce—Ga composite oxide. In the event of preparing the aqueous alkali metal solution, it is preferable to use the alkali metal in the form of salt, a hydroxide or an oxide. Moreover, as the salt, a carbonate is particularly preferable since the carbonate is easy to handle and has high storage stability. In accordance with this production method, the alkali metal can be supported on the Ce—Ga composite oxide from the step where the Ce—Ga composite oxide is in the form of the precursor. As described above, when the alkali metal remains on the surface of the Ce—Ga composite oxide, the PM oxidation temperature decreases. Note that, with regard to the obtained oxidation catalyst, even if XRD analysis is performed therefor, diffraction peaks derived from the alkali metal or the salt, hydroxide or oxide of the alkali metal are not observed. However, when the obtained oxidation catalyst is analyzed by ICP mass analysis, peaks derived from the alkali metal, for example, such as Na are observed. From this fact, it is conceived that the alkali metal exists in the form of the salt, the hydroxide or the oxide on the obtained oxidation catalyst though an amount thereof is very small.

As described above, in accordance with the method for producing the oxidation catalyst according to the embodiment of the present invention, the oxidation catalyst capable of decreasing the PM oxidation temperature is obtained.

Note that, though the PM oxidation catalyst to be used for promoting the combustion of the PM containing, as a main component, the soot emitted from the diesel engine or for decreasing the combustion temperature of the PM has been illustrated as an example of the oxidation catalyst, the present invention is not limited to the PM oxidation catalyst, and is applicable to other engines for which the oxidation catalyst is required.

EXAMPLES

A description will be made below of Example 1 to Example 42 of the oxidation catalyst according to the embodiment of the present invention and Comparative example 1 and Comparative example 2 thereof. These examples were carried out in order to investigate effectiveness of the oxidation catalyst according to the present invention, the respective samples were prepared by treating different raw materials under different conditions, and the present invention is not limited to the illustrated examples.

Example 1

Cerium nitrate and gallium nitrate were weighed out so that a molar ratio of Ce/Ga could become 97/3, and were dissolved into ion exchange water. After a resultant aqueous solution was stirred for 1 hour, an aqueous sodium hydroxide solution was dropped thereinto to thereby adjust pH thereof, and a precipitate of a Ce—Ga hydroxide was obtained. The obtained precipitate was dried at 150° C. day and night, and was further baked at 500° C., whereby an oxidation catalyst of Example 1 was obtained.

Example 2

Similar operations to those of Example 1 were repeated except that the molar ratio of Ce/Ga was set at 95/5, whereby an oxidation catalyst of Example 2 was obtained.

Example 3

Similar operations to those of Example 1 were repeated except that the molar ratio of Ce/Ga was set at 85/15, whereby an oxidation catalyst of Example 3 was obtained.

Example 4

Similar operations to those of Example 1 were repeated except that the molar ratio of Ce/Ga was set at 68/32, whereby an oxidation catalyst of Example 4 was obtained.

Example 5

Similar operations to those of Example 1 were repeated except that an aqueous ammonia solution was used in place of the aqueous sodium hydroxide solution, whereby an oxidation catalyst of Example 5 was obtained.

Example 6

Similar operations to those of Example 2 were repeated except that the aqueous ammonia solution was used in place of the aqueous sodium hydroxide solution, whereby an oxidation catalyst of Example 6 was obtained.

Example 7

Similar operations to those of Example 3 were repeated except that the aqueous ammonia solution was used in place of the aqueous sodium hydroxide solution, whereby an oxidation catalyst of Example 7 was obtained.

Example 8

Similar operations to those of Example 4 were repeated except that the aqueous ammonia solution was used in place of the aqueous sodium hydroxide solution, whereby an oxidation catalyst of Example 8 was obtained.

Example 9

Similar operations to those of Example 1 were repeated except that manganese nitrate was added to the above-mentioned cerium nitrate and gallium nitrate so that a molar ratio of Mn/(Ce+Ga) could become 5/100, whereby an oxidation catalyst of Example 9 was obtained.

Example 10

Similar operations to those of Example 9 were repeated except that the manganese nitrate was added to the cerium nitrate and the gallium nitrate so that the molar ratio of Mn/(Ce+Ga) could become 10/100, whereby an oxidation catalyst of Example 10 was obtained.

Example 11

Similar operations to those of Example 9 were repeated except that the manganese nitrate was added to the cerium nitrate and the gallium nitrate so that the molar ratio of Mn/(Ce+Ga) could become 20/100, whereby an oxidation catalyst of Example 11 was obtained.

Example 12

Similar operations to those of Example 9 were repeated except that the manganese nitrate was added to the cerium nitrate and the gallium nitrate so that the molar ratio of Mn/(Ce+Ga) could become 30/100, whereby an oxidation catalyst of Example 12 was obtained.

Example 13

Similar operations to those of Example 9 were repeated except that the manganese nitrate was added to the cerium nitrate and the gallium nitrate so that the molar ratio of Mn/(Ce+Ga) could become 50/100, whereby an oxidation catalyst of Example 13 was obtained.

Example 14

Similar operations to those of Example 2 were repeated except that the manganese nitrate was added to the above-mentioned cerium nitrate and gallium nitrate so that the molar ratio of Mn/(Ce+Ga) could become 5/100, whereby an oxidation catalyst of Example 14 was obtained.

Example 15

Similar operations to those of Example 14 were repeated except that the manganese nitrate was added to the cerium nitrate and the gallium nitrate so that the molar ratio of Mn/(Ce+Ga) could become 10/100, whereby an oxidation catalyst of Example 15 was obtained.

Example 16

Similar operations to those of Example 14 were repeated except that the manganese nitrate was added to the cerium nitrate and the gallium nitrate so that the molar ratio of Mn/(Ce+Ga) could become 20/100, whereby an oxidation catalyst of Example 16 was obtained.

Example 17

Similar operations to those of Example 14 were repeated except that the manganese nitrate was added to the cerium nitrate and the gallium nitrate so that the molar ratio of Mn/(Ce+Ga) could become 30/100, whereby an oxidation catalyst of Example 17 was obtained.

Example 18

Similar operations to those of Example 14 were repeated except that the manganese nitrate was added to the cerium nitrate and the gallium nitrate so that the molar ratio of Mn/(Ce+Ga) could become 50/100, whereby an oxidation catalyst of Example 18 was obtained.

Example 19

Similar operations to those of Example 3 were repeated except that the manganese nitrate was added to the above-mentioned cerium nitrate and gallium nitrate so that the molar ratio of Mn/(Ce+Ga) could become 5/100, whereby an oxidation catalyst of Example 19 was obtained.

Example 20

Similar operations to those of Example 19 were repeated except that the manganese nitrate was added to the cerium nitrate and the gallium nitrate so that the molar ratio of Mn/(Ce+Ga) could become 10/100, whereby an oxidation catalyst of Example 20 was obtained.

Example 21

Similar operations to those of Example 19 were repeated except that the manganese nitrate was added to the cerium nitrate and the gallium nitrate so that the molar ratio of Mn/(Ce+Ga) could become 20/100, whereby an oxidation catalyst of Example 21 was obtained.

Example 22

Similar operations to those of Example 19 were repeated except that the manganese nitrate was added to the cerium nitrate and the gallium nitrate so that the molar ratio of Mn/(Ce+Ga) could become 30/100, whereby an oxidation catalyst of Example 22 was obtained.

Example 23

Similar operations to those of Example 19 were repeated except that the manganese nitrate was added to the cerium nitrate and the gallium nitrate so that the molar ratio of Mn/(Ce+Ga) could become 50/100, whereby an oxidation catalyst of Example 23 was obtained.

Example 24

Similar operations to those of Example 4 were repeated except that the manganese nitrate was added to the above-mentioned cerium nitrate and gallium nitrate so that the molar ratio of Mn/(Ce+Ga) could become 5/100, whereby an oxidation catalyst of Example 24 was obtained.

Example 25

Similar operations to those of Example 24 were repeated except that the manganese nitrate was added to the cerium nitrate and the gallium nitrate so that the molar ratio of Mn/(Ce+Ga) could become 10/100, whereby an oxidation catalyst of Example 25 was obtained.

Example 26

Similar operations to those of Example 24 were repeated except that the manganese nitrate was added to the cerium nitrate and the gallium nitrate so that the molar ratio of Mn/(Ce+Ga) could become 20/100, whereby an oxidation catalyst of Example 26 was obtained.

Example 27

Similar operations to those of Example 24 were repeated except that the manganese nitrate was added to the cerium nitrate and the gallium nitrate so that the molar ratio of Mn/(Ce+Ga) could become 30/100, whereby an oxidation catalyst of Example 27 was obtained.

Example 28

Similar operations to those of Example 24 were repeated except that the manganese nitrate was added to the cerium nitrate and the gallium nitrate so that the molar ratio of Mn/(Ce+Ga) could become 50/100, whereby an oxidation catalyst of Example 28 was obtained.

Example 29

Similar operations to those of Example 1 were repeated except that ferric nitrate was added to the above-mentioned cerium nitrate and gallium nitrate so that a molar ratio of Fe/(Ce+Ga) could become 5/100, whereby an oxidation catalyst of Example 29 was obtained.

Example 30

Similar operations to those of Example 29 were repeated except that the ferric nitrate was added to the cerium nitrate and the gallium nitrate so that the molar ratio of Fe/(Ce+Ga) could become 10/100, whereby an oxidation catalyst of Example 30 was obtained.

Example 31

Similar operations to those of Example 29 were repeated except that the ferric nitrate was added to the cerium nitrate and the gallium nitrate so that the molar ratio of Fe/(Ce+Ga) could become 20/100, whereby an oxidation catalyst of Example 31 was obtained.

Example 32

Similar operations to those of Example 29 were repeated except that the ferric nitrate was added to the cerium nitrate and the gallium nitrate so that the molar ratio of Fe/(Ce+Ga) could become 25/100, whereby an oxidation catalyst of Example 32 was obtained.

Example 33

Similar operations to those of Example 29 were repeated except that the ferric nitrate was added to the cerium nitrate and the gallium nitrate so that the molar ratio of Fe/(Ce+Ga) could become 30/100, whereby an oxidation catalyst of Example 33 was obtained.

Example 34

Similar operations to those of Example 29 were repeated except that the ferric nitrate was added to the cerium nitrate and the gallium nitrate so that the molar ratio of Fe/(Ce+Ga) could become 35/100, whereby an oxidation catalyst of Example 34 was obtained.

Example 35

Similar operations to those of Example 29 were repeated except that the ferric nitrate was added to the cerium nitrate and the gallium nitrate so that the molar ratio of Fe/(Ce+Ga) could become 50/100, whereby an oxidation catalyst of Example 35 was obtained.

Example 36

Similar operations to those of Example 2 were repeated except that the ferric nitrate was added to the above-mentioned cerium nitrate and gallium nitrate so that the molar ratio of Fe/(Ce+Ga) could become 5/100, whereby an oxidation catalyst of Example 36 was obtained.

Example 37

Similar operations to those of Example 36 were repeated except that the ferric nitrate was added to the cerium nitrate and the gallium nitrate so that the molar ratio of Fe/(Ce+Ga) could become 10/100, whereby an oxidation catalyst of Example 37 was obtained.

Example 38

Similar operations to those of Example 36 were repeated except that the ferric nitrate was added to the cerium nitrate and the gallium nitrate so that the molar ratio of Fe/(Ce+Ga) could become 20/100, whereby an oxidation catalyst of Example 38 was obtained.

Example 39

Similar operations to those of Example 36 were repeated except that the ferric nitrate was added to the cerium nitrate and the gallium nitrate so that the molar ratio of Fe/(Ce+Ga) could become 25/100, whereby an oxidation catalyst of Example 39 was obtained.

Example 40

Similar operations to those of Example 36 were repeated except that the ferric nitrate was added to the cerium nitrate and the gallium nitrate so that the molar ratio of Fe/(Ce+Ga) could become 30/100, whereby an oxidation catalyst of Example 40 was obtained.

Example 41

Similar operations to those of Example 36 were repeated except that the ferric nitrate was added to the cerium nitrate and the gallium nitrate so that the molar ratio of Fe/(Ce+Ga) could become 35/100, whereby an oxidation catalyst of Example 41 was obtained.

Example 42

Similar operations to those of Example 36 were repeated except that the ferric nitrate was added to the cerium nitrate and the gallium nitrate so that the molar ratio of Fe/(Ce+Ga) could become 50/100, whereby an oxidation catalyst of Example 42 was obtained.

Comparative Example 1

Similar operations to those of Example 1 were repeated except that only the cerium nitrate was used without using the gallium nitrate, whereby an oxidation catalyst of Comparative example 1 was obtained.

Comparative Example 2

Similar operations to those of Comparative example 1 were repeated except that the aqueous ammonia solution was used in place of the aqueous sodium hydroxide solution, whereby an oxidation catalyst of Comparative example 2 was obtained.

<Performance Evaluation>
(1) Whether or Not Solid Solution Occurred

The oxidation catalysts of Example 1 and Example 3 were subjected to X-ray diffraction analysis, and it was determined whether or not the solid solution of Ga occurred therein. As an analyzer, an X-ray diffraction apparatus (XRD: MXP18VAHF) made by MAC Science Co., Ltd. was used. Measurement of the X-ray diffraction was performed under conditions where a radiation source was a CuKα ray, a voltage was 40 kV, and a current was 300 mA.

Results thus obtained are shown in FIG. 2. As shown in FIG. 2, it was able to be observed that, in the oxidation catalysts of Example 1 and Example 3, the respective diffraction peaks were shifted from peak positions of $CeO_2$. For example, in Example 3 where Ce was substituted with Ga by 15 moles, a value of 2θ at a peak position 2B1 on a (331) diffraction plane is 77°, which is larger than 76. 77° as a value of 2θ at a peak position 2B3 on a (331) diffraction plane of Example 1 where Ce was substituted with Ga by 3 moles. A value of 2θ at a peak position on a (331) diffraction plane of $CeO_2$ that was not substituted with Ga is 76.70°, and it is understood that the value of 2θ at the peak position on the (331) diffraction plane is shifted more largely as the solid solution amount of Ga becomes larger. In a similar way, in Example 3 where Ce was substituted with Ga by 15 moles, a value of 2θ at a peak position 2B2 on a (420) diffraction plane is 79.37°, which is larger than 70.15° as a value of 2θ at a peak position 2B4 on a (420) diffraction plane of Example 1 where Ce was substituted with Ga by 3 moles, and it is understood that the value of 2θ at the peak position on the (420) diffraction plane is shifted more largely as the solid solution amount of Ga becomes larger. As described above, from the results of the X-ray diffraction analysis for Example 1 and Example 3, it has been understood that solid solutions in each of which a considerable amount of Ga is solid-solved are generated.

Moreover, Mn contained in the oxidation catalyst of each of Examples 9 to 28 was not detected as an oxide phase in the X-ray diffraction analysis, and was not able to be observed as particles even by means of a TEM. In a similar way, Fe contained in the oxidation catalyst of each of Examples 29 to 42 was not detected as an oxide phase in the X-ray diffraction analysis, and was not able to be observed as particles even by means of the TEM. Hence, it is conceived that these Mn and Fe are highly dispersed, or are solid-solved into the composite oxide.

(2) PM Oxidation Performance

The oxidation catalyst powder in each of the examples and soot (PM) collected from an automotive engine were mixed together in a mortar, whereby a sample was prepared. Each sample was used as a catalyst bed, and a temperature thereof was changed while introducing a mixed gas flow of 5 vol % of $O_2$ gas and He gas (in a balance amount) thereinto. Temperatures at which carbon monoxide (CO) and carbon dioxide ($CO_2$) were generated were measured by using a mass spectrometer, and measured values thus obtained were defined as PM oxidation starting temperatures. Obtained results are shown in FIG. 3 to FIG. 5.

(3) ICP Mass Spectrometry

The oxidation catalyst obtained in each of the examples was analyzed by the inductively coupled plasma atomic emission spectrometry (ICP-AES) by using an inductively coupled plasma atomic emission spectrometer SPS-1700HVR made by SII Nano Technology Inc.

In accordance with each result obtained in Example 1 to Example 8, Example 11, Example 16, Example 21 and Example 26, the PM oxidation starting temperature was decreased when Ga was solid-solved. Moreover, it has been understood that, when NaOH is used as an alkaline solution, the obtained oxidation catalyst contains several mass percents of Na, and the PM oxidation starting temperature is decreased. Furthermore, it has been understood that the PM oxidation starting temperature is further decreased in the case where the oxidation catalyst contains Mn.

Moreover, in accordance with results in Example 1, Example 2 and Example 9 to Example 18, it has been understood that the PM oxidation starting temperature is decreased as a content of Mn in the oxidation catalyst becomes larger. The PM oxidation starting temperature was rather decreased in the case where the solid solution amount of Ga was 5 moles, and was decreased most when the additive amount of Mn were 30 mol %. It is conceived that the PM oxidation starting temperature is increased since a $Ga_2O_3$ phase develops besides $CeO_2$ when the additive amount of Mn are increased up to 50 mol %.

In a similar way, in accordance with results of Example 1, Example 2 and Example 29 to Example 42, it has been understood that the PM oxidation starting temperature is decreased as the oxidation catalyst contains a larger amount of Fe. The PM oxidation starting temperature was rather decreased in the case where the solid solution amount of Ga was 5 moles, and was decreased most when the additive amount of Fe were 30 mol %. It is conceived that the PM oxidation starting temperature is increased since the $Ga_2O_3$ phase develops besides $CeO_2$ when the additive amount of Mn are increased up to 50 mol %.

As described above, it has been understood that, in each of the samples obtained in Example 1 to Example 42, the Ce—Ga composite oxide containing the solid solution in which a part of Ce was substituted with Ga was formed, and accordingly, the oxidation catalyst capable of effectively decreasing the PM combustion temperature was obtained.

The description has been made above of the embodiment of the present invention; however, it should not be understood that the description and the drawings, which form a part of the disclosure of the above-mentioned embodiment, limit this invention. From this disclosure, a variety of alternative embodiments, examples and operation technologies will be apparent for those skilled in the art.

The entire contents of Japanese Patent Application No. 2007-210798 (filed on: Aug. 13, 2007), Japanese Patent Application No. 2008-036949 (filed on: Feb. 19, 2008) and Japanese Patent Application No. 2008-168404 (filed on: Jun. 27, 2008) are incorporated herein by reference.

INDUSTRIAL APPLICABILITY

In accordance with the present invention, the Ce—Ga composite oxide containing the solid solution in which a part of Ce is substituted with Ga is formed, and accordingly, the oxidation catalyst capable of effectively decreasing the PM combustion temperature and the method for producing the oxidation catalyst can be provided.

The invention claimed is:

1. An oxidation catalyst that decreases a PM oxidation or combustion temperature, consisting of: a Ce—Ga composite oxide consisting of Ce, Ga and oxygen, and an alkali metal, wherein
    the Ce—Ga composite oxide has a crystal structure and contains a solid solution in which Ga exists at a portion of Ce sites of the crystal structure,
    the alkali metal exists on a surface of the Ce—Ga composite oxide and is capable of promoting oxidation of the PM, wherein
    the oxidation catalyst is capable of decreasing a PM oxidation temperature or combustion temperature, wherein
    a molar ratio of Ce/Ga in the solid solution of the Ce—Ga composite oxide is 97/3 to 85/15.

2. The oxidation catalyst that decreases the PM oxidation or combustion temperature according to claim 1, wherein the Ce—Ga composite oxide has a fluorite crystal structure.

3. An oxidation catalyst that decreases a PM oxidation or combustion temperature, consisting of: a Ce—Ga composite oxide consisting of Ce, Ga, Mn and oxygen, and an alkali metal, wherein
    the Ce—Ga composite oxide has a crystal structure and contains a solid solution in which Ga exists at a portion of Ce sites of the crystal structure,
    the alkali metal exists on a surface of the Ce—Ga composite oxide and is capable of promoting oxidation of the PM, wherein
    the oxidation catalyst is capable of decreasing a PM oxidation temperature or combustion temperature, wherein
    a molar ratio of Ce/Ga in the solid solution of the Ce—Ga composite oxide is 97/3 to 85/15, and wherein
    a molar ratio of Mn/(Ce+Ga) in the Ce—Ga composite oxide is 0.01/100 to 50/100.

4. The oxidation catalyst that decreases the PM oxidation or combustion temperature according to claim 3, the molar ratio of Mn/(Ce+Ga) in the Ce—Ga composite oxide is 0.01/100 to 30/100.

5. An oxidation catalyst that decreases a PM oxidation or combustion temperature, consisting of: a Ce—Ga composite oxide consisting of Ce, Ga, Fe and oxygen, and an alkali metal, wherein
the Ce—Ga composite oxide has a crystal structure and contains a solid solution in which Ga exists at a portion of Ce sites of the crystal structure,
the alkali metal exists on a surface of the Ce—Ga composite oxide and is capable of promoting oxidation of the PM, wherein
the oxidation catalyst is capable of decreasing a PM oxidation temperature or combustion temperature, wherein
a molar ratio of Ce/Ga in the solid solution of the Ce—Ga composite oxide is 97/3 to 85/15, and wherein
a molar ratio of Fe/(Ce+Ga) in the Ce—Ga composite oxide is 0.01/100 to 50/100.

6. The oxidation catalyst that decreases the PM oxidation or combustion temperature according to claim 5, wherein the molar ratio of Fe/(Ce+Ga) in the Ce—Ga composite oxide is 0.01/100 to 30/100.

7. The oxidation catalyst that decreases the PM oxidation or combustion temperature according to claim 1, wherein the alkali metal is Na, and an amount of Na is within a range from 0.01 to 10 moles with respect to 1 mol of the Ce—Ga composite oxide.

8. The oxidation catalyst that decreases the PM oxidation or combustion temperature according to claim 1, wherein the Ce—Ga composite oxide is a $CeO_2$—$Ga_2O_3$ composite oxide.

9. The oxidation catalyst that decreases the PM oxidation or combustion temperature according to claim 1, wherein the molar ratio of Ce/Ga in the solid solution of the Ce—Ga composite oxide is 97/3 to 95/5.

10. The oxidation catalyst that decreases the PM oxidation or combustion temperature according to claim 3, wherein the alkali metal is Na, and an amount of Na is within a range from 0.01 to 10 moles with respect to 1 mol of Ce—Ga composite oxide.

11. The oxidation catalyst that decreases the PM oxidation or combustion temperature according to claim 3, wherein the Ce—Ga composite oxide is a $CeO_2$—$Ga_2O_3$ composite oxide.

12. The oxidation catalyst that decreases the PM oxidation or combustion temperature according to claim 3, wherein the molar ratio of Ce/Ga in the solid solution of the Ce—Ga composite oxide is 97/3 to 95/5.

13. The oxidation catalyst that decreases the PM oxidation or combustion temperature according to claim 5, wherein the alkali metal is Na, and an amount of Na is within a range from 0.01 to 10 moles with respect to 1 mol of Ce—Ga composite oxide.

14. The oxidation catalyst that decreases the PM oxidation or combustion temperature according to claim 5, wherein the Ce—Ga composite oxide is a $CeO_2$—$Ga_2O_3$ composite oxide.

15. The oxidation catalyst that decreases the PM oxidation or combustion temperature according to claim 5, wherein the molar ratio of Ce/Ga in the solid solution of the Ce—Ga composite oxide is 97/3 to 95/5.

* * * * *